United States Patent
Ackelid

(10) Patent No.: US 11,214,004 B2
(45) Date of Patent: *Jan. 4, 2022

(54) BUILD COMPARTMENT WITH SELF-SEALING DESIGN

(71) Applicant: Freemelt AB, Mölndal (SE)

(72) Inventor: Ulf Ackelid, Gothenburg (SE)

(73) Assignee: FREEMELT AB, Mölndal (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/050,924

(22) PCT Filed: Apr. 25, 2019

(86) PCT No.: PCT/EP2019/060622
§ 371 (c)(1),
(2) Date: Oct. 27, 2020

(87) PCT Pub. No.: WO2019/207049
PCT Pub. Date: Oct. 31, 2019

(65) Prior Publication Data
US 2021/0229354 A1    Jul. 29, 2021

Related U.S. Application Data

(60) Provisional application No. 62/663,282, filed on Apr. 27, 2018.

(51) Int. Cl.
*B33Y 30/00* (2015.01)
*B29C 64/255* (2017.01)
(Continued)

(52) U.S. Cl.
CPC ............ *B29C 64/25* (2017.08); *B29C 64/153* (2017.08); *B29C 64/255* (2017.08);
(Continued)

(58) Field of Classification Search
CPC ..... B29C 64/255; B29C 64/295; B29C 64/35; B29C 64/379; B29C 64/321; B22F 12/17; B22F 12/38; B22F 12/50; B22F 12/88
See application file for complete search history.

(56) References Cited

U.S. PATENT DOCUMENTS

| 2017/0050378 A1* | 2/2017 | Ederer | B29C 64/255 |
| 2018/0029349 A1* | 2/2018 | Herzog | B29C 64/245 |

(Continued)

FOREIGN PATENT DOCUMENTS

| DE | 102009020987 | * 11/2010 |
| EP | 2 926 923 A1 | 10/2015 |

(Continued)

OTHER PUBLICATIONS

English translation of DE 102009020987.*
U.S. Appl. No. 17/257,100, filed Dec. 30, 2020, Ulf Ackelid.

*Primary Examiner* — Mary Lynn F Theisen
(74) *Attorney, Agent, or Firm* — Faegre Drinker Biddle & Reath LLP

(57) ABSTRACT

The present invention relates to a build compartment used in 3D printing systems based on powder beds. The build compartment is the volume in a 3D printing apparatus where 3D objects are formed by successive consolidation of thin layers of powder. The build compartment is designed with at least two vertical wall structures movable in relation to each other. The movable wall structures are at least partly overlapping in the movable direction, providing self-sealing for a variable volume for enclosing powder. Contrary to other available designs, this solution does not need a compressible sealing material, for example an elastomer, a textile felt or a braided rope, to prevent powder leakage from the build compartment. The advantages are more reliable sealing and no risk of contamination of the powder by debris from sealing material.

12 Claims, 6 Drawing Sheets

(51) Int. Cl.
*B29C 64/35* (2017.01)
*B29C 64/295* (2017.01)
*B29C 64/25* (2017.01)
*B29C 64/153* (2017.01)

(52) U.S. Cl.
CPC ............ *B29C 64/295* (2017.08); *B29C 64/35* (2017.08); *B33Y 30/00* (2014.12)

(56) References Cited

U.S. PATENT DOCUMENTS

2018/0361670 A1* 12/2018 Kobayashi .............. B29C 64/20
2021/0046703 A1*  2/2021 Hoppe .................. B33Y 10/00
2021/0162668 A1   6/2021 Ackelid

FOREIGN PATENT DOCUMENTS

| | | |
|---|---|---|
| EP | 3 480 000 A1 | 5/2019 |
| GB | 2 503 215 A | 12/2013 |
| WO | WO-2005/025780 A1 | 3/2005 |
| WO | WO-2017/054859 A1 | 4/2017 |
| WO | WO-2018/210521 A1 | 11/2018 |
| WO | WO-2019/020340 A1 | 1/2019 |

* cited by examiner

BUILD COMPARTMENT WITH SELF-SEALING DESIGN

BACKGROUND

This invention relates to an additive manufacturing machine for producing a three-dimensional object from a granular material, more specifically a powder material, by consolidation of the powder material layer by layer in a powder bed. Consolidation can be carried out by various means, for example fusion or sintering with an energy beam or bonding by binder jetting.

DESCRIPTION OF RELATED ART

Presently available powder bed additive manufacturing machines normally have a movable table for lowering the consecutively built three-dimensional object inside a build compartment during the manufacturing process. To prevent leakage of powder, it is common practice to have a compressible sealing material, for example an elastomer, a textile felt or a braided rope, between the movable table and the build compartment surrounding the powder and the three-dimensional object. In such machines there are often problems with powder leakage due to a defective seal. This could for example be due to challenging environment in the machine such as friction, heat, vacuum, radiation, etc., causing the seal material to degrade and lose its sealing properties. An additional problem is that the powder and three-dimensional object could be contaminated by debris from the degraded seal. Such contamination could degrade the material properties of the three-dimensional object and it could also make it impossible to reuse excess powder from the build compartment.

SUMMARY OF THE INVENTION

This invention relates to an apparatus for manufacturing a three-dimensional object from powder, comprising a build compartment having at least two wall structures movable in relation to each other, said wall structures are at least partly overlapping in the movable direction, providing a variable volume for enclosing powder.

In embodiments, said at least two wall structures are vertical wall structures.

In embodiments, said at least two wall structures are inner and outer wall structures.

In embodiments, said inner wall structure has a fixed position and said outer wall structure being movable, wherein a floor is attached to said outer wall structure.

In embodiments, said two wall structures have the geometry of an inner cylinder and an outer cylinder.

In embodiments, said two wall structures have the geometry of an inner circular cylinder and an outer circular cylinder.

In embodiments, the apparatus comprises a third wall structure for reducing internal unused volume for the three-dimensional object of said build compartment.

In embodiments, the apparatus comprises a mechanism for emptying loose powder from said build compartment.

In embodiments, the apparatus comprises a device for cooling of said build compartment.

In embodiments, the apparatus comprises a device for heating of said build compartment.

In embodiments, said three-dimensional object is manufactured layer by layer from said powder.

In embodiments, said three-dimensional object is manufactured by additive manufacturing.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

In the description of the invention references is made to the following figures, in which:

FIG. 2A represents an early stage of the manufacturing process and FIG. 2B represents the final stage where the manufacturing has been finished.

FIG. 3A represents an early stage of the manufacturing process and FIG. 3B represents the final stage where the manufacturing has been finished.

FIG. 4A represents an early stage of the manufacturing process and FIG. 4B represents the final stage where the manufacturing has been finished.

FIG. 5A represents an early stage of the manufacturing process and FIG. 5B represents the final stage where the manufacturing has been finished.

FIG. 6A represents an early stage of the manufacturing process and FIG. 6B represents the final stage where the manufacturing has been finished.

Embodiments of the present disclosure and their advantages are best understood by referring to the detailed description that follows. It should be appreciated that like reference numerals are used to identify like elements illustrated in one or more of the figures.

DESCRIPTION AND DISCLOSURE OF THE INVENTION

To facilitate the understanding of this invention, a few terms are defined below.

The term "powder" refers in this context to any type of granular material, regardless of size, shape and composition of the individual particles or granules that are the constituents of the granular material.

The term "three-dimensional object" refers in this context to any type of three dimensional preform, or any combination of three-dimensional preforms, that can be shaped from powder in an additive manufacturing machine. It is understood that the three-dimensional object, such as it comes out from the additive manufacturing machine, may require one or several steps of further processing to reach a state where it is ready for its intended use.

The term "manufacturing" refers in this context solely to the process of bonding powder particles together into a three-dimensional object in an additive manufacturing machine. The bonding can be carried out for example by fusion or sintering with an energy beam, or by adding a liquid binding agent. Thus, in this context, the term "manufacturing" does not imply that the three-dimensional object has reached its final state. The three-dimensional object may require one or several steps of further processing to reach a state where it is ready for its intended use.

Figure 1A:
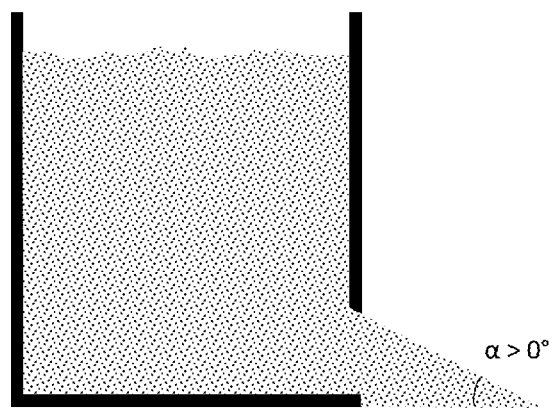
FIG. 1A shows, in a schematic section view, powder flowing out from an opening in a container, creating a stationary powder slope with an angle of repose a. No continuous flow of powder from the opening in the container.
Figure 1B:
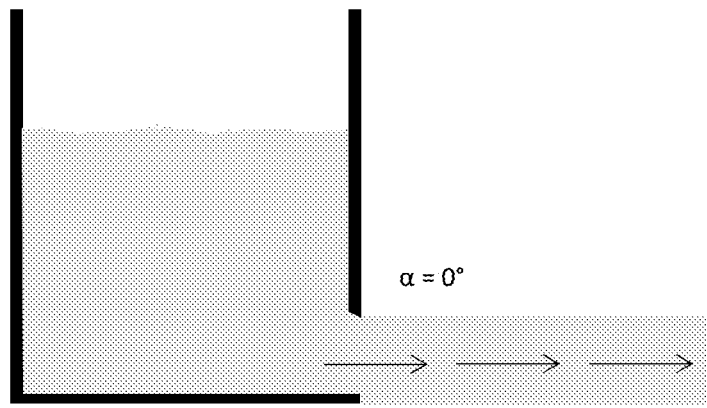
FIG. 1B shows, in a schematic section view, a liquid flowing out from an opening in a container. In contrast to FIG. 1A, the liquid will continue to flow until the container is empty.

The invention being disclosed here is based on the understanding that powder materials cannot flow upwards and hence a sealing can be achieved by side walls of a container overlapping each other. Powders can support shear stresses unlike gases and liquids. When allowing powder to flow from an opening near the bottom of a container, the powder present an angle of repose a that is greater than zero degrees, as depicted in FIG. 1A. This means that the supporting shear forces internally between the powder grains in the powder will create a powder slope and the powder will stop flowing out from the container when the powder slope has reached the upper edge of the opening. A liquid, on the other hand, has normally an angle of repose equal to zero degrees, as depicted in FIG. 1B. The liquid does not create a stationary slope preventing it from flowing out. Thus, the liquid will continue to flow until the container is empty.

The purpose of this invention is to provide a self-sealing build compartment that does not contaminate the powder, is easy to clean and works for many different powder materials. This purpose is achieved by the apparatus defined in the independent claim. The dependent claims contain advantageous embodiments, further developments and variants of the invention.

Figure 2A:
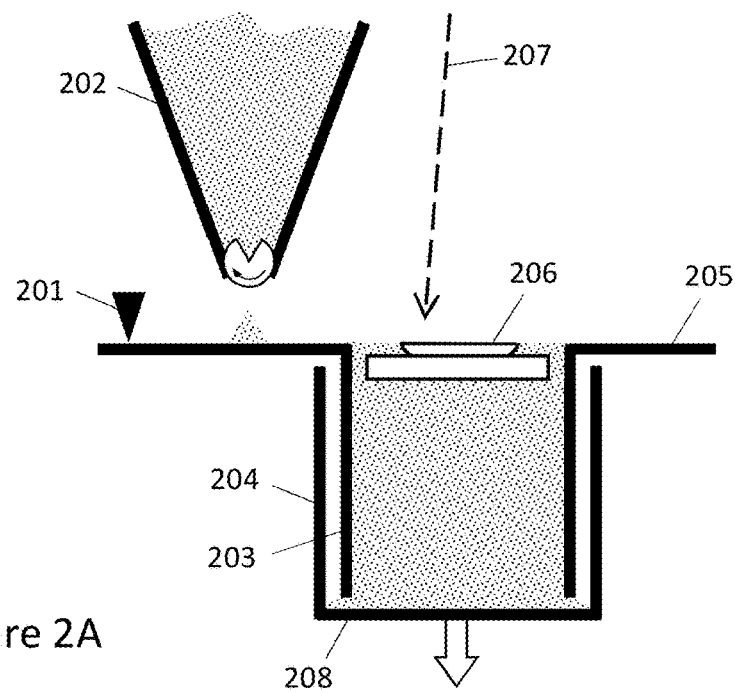
FIGS. 2A and 2B show, in a schematic section view, a preferred embodiment of the invention.
Figure 2B:
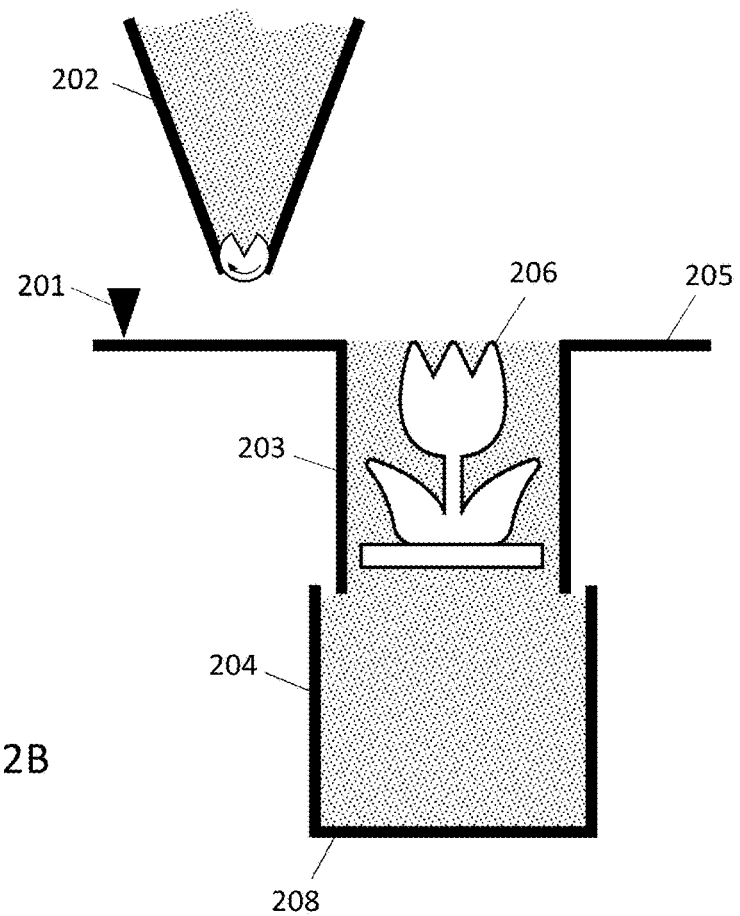

An embodiment of this invention is shown in FIGS. 2A and 2B. An apparatus is provided having a build compartment for containing powder and the manufactured three-dimensional object. The build compartment has a first fixed vertical inner wall structure 203 and a second outer vertical wall structure 204 movable downwards to expand the volume of said build compartment, thus creating a variable volume. The variable volume is used for expanding the build volume by lowering the floor 208 successively during the manufacturing of the three-dimensional object 206 layer by layer. The movable part of said build compartment is constituted of the second wall structure 204 and a floor 208 attached to said second wall structure 204 with a leak free connection for preventing powder to flow out from the compartment. When the second wall structure 204 and the floor 208 is moved downwards in relation to the first wall structure 203, the volume of the build compartment will expand. The first 203 and second 204 wall structures can be formed with a suitable cross section in the horizontal plane, for example circular or square cross section, for forming the volume of the build compartment. The volume of the build compartment is formed by the first wall structure 203 and the floor 208 for limiting the powder and object 206 from escaping from the build compartment. The compartment has an open end, at the top, providing a powder surface for melting a powder layer with an energy beam 207 and successively building of a three-dimensional object 206. During manufacturing of the three-dimensional object 206, said movable part of said build compartment is being lowered layer by layer. The first 203 and second 204 vertical walls are arranged substantially parallel to each other and overlapping each other in the vertical direction and being spaced with a distance creating a gap between the first 203 and second 204 walls in the horizontal direction. The distance of said gap could preferably be in the range 0.3-3.0 mm for powder sizes commonly used in powder bed additive manufacturing systems. Even if there is a horizontal gap, the powder will be prevented from flowing out from said build compartment due to the fact that powder cannot flow upwards. When said movable part successively is lowered, the powder will be prevented from flowing out from the compartment due to the overlap between the first 203 and second 204 vertical walls creating a vertical distance between the lower edge of said first wall structure 203 and the upper edge of said second wall structure 204. To avoid powder from flowing out from the build compartment, the lower most position of the movable part is limited to a position where the first 203 and second wall structure 204 will prevent the powder from flowing out from the build compartment.

For clarity and completeness, FIGS. 2A and 2B also show a schematic powder distribution system comprising a powder container 202, from which small portions of powder are provided, a powder distributor 201 that moves over the powder bed and a powder table 205 for distribution of a thin layer of powder. It should be pointed out that powder distribution systems can be embodied in many different ways and the schematic representation in FIGS. 2A and 2B is for illustration only. The powder distribution system will not be further discussed, since it is irrelevant for the function of the present invention.

Figure 3A:
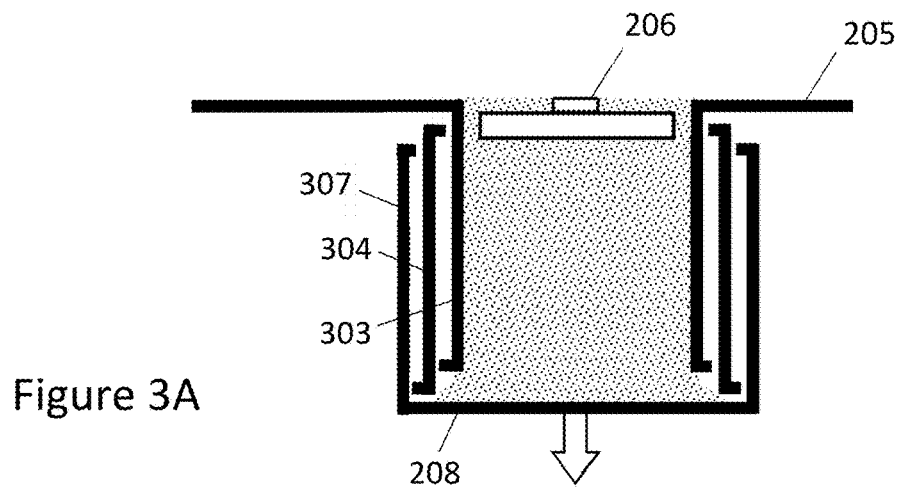
FIGS. 3A and 3B show, in a schematic section view, an embodiment of the invention.
Figure 3B:
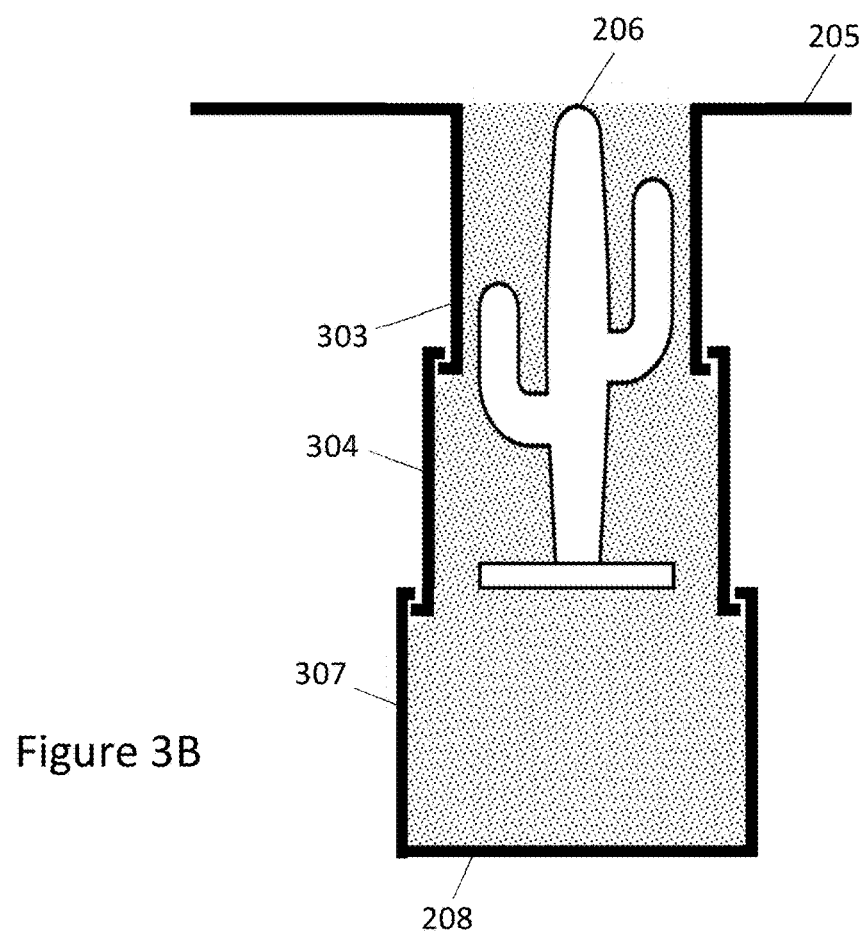

In another embodiment, shown in FIGS. 3A and 3B, the build compartment is telescopic with multiple wall structures 303, 304, 307 sliding into one another. Three wall structures 303, 304, 307 are depicted in FIGS. 3A and 3B, but a larger number of wall structures may also be used. The function of this embodiment is identical with the previous one, with the added advantage that a three-dimensional object 206 with increased height can be manufactured with a reduced total height of the build compartment.

Figure 4A:
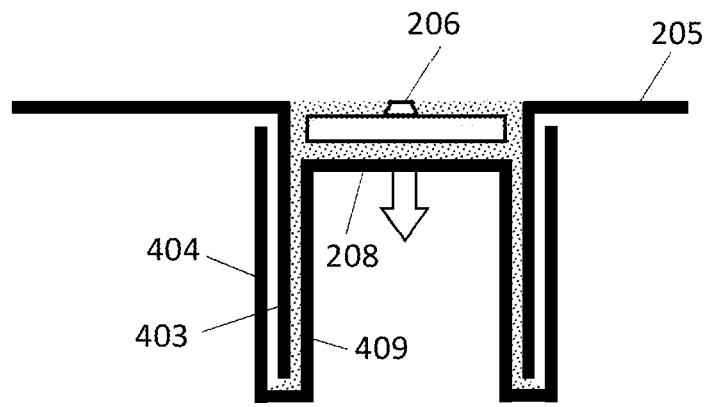
FIGS. 4A and 4B show, in a schematic section view, an embodiment of the invention.
Figure 4B:
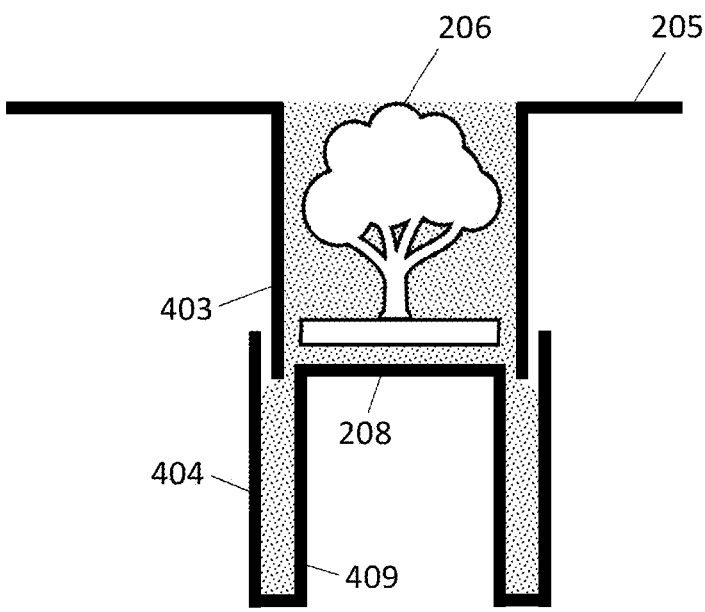

In yet another embodiment, shown in FIGS. 4A and 4B, the movable part consists of a second wall structure 404, a third wall structure 409 and a floor 208 connected to each other. When the movable part is provided with a third vertical wall structure 409 it is possible to position the floor 208 higher up in the build compartment. In this way there will be less powder needed to fill up the compartment before starting the manufacturing of the three-dimensional object 206 since elsewise the powder distributor 201 need to fill the unused volume of the build compartment with powder before the object 206 can start to be manufactured. When a third wall structure 409 is provided an unused dead volume of powder will be avoided below the manufactured object. In this case there will be two horizontal gaps between the first 409, second 403 and third 404 vertical walls. Both the second 404 and the third wall structure 409 are at least partially overlapping the first wall structure 403 in the movable direction. By providing a third wall structure 409 an unused powder volume can be avoided by reducing the internal volume of the build compartment. Hence a larger portion of the build compartment is used by the three-dimensional object and internal unused volume of said build compartment is reduced.

Figure 5A:
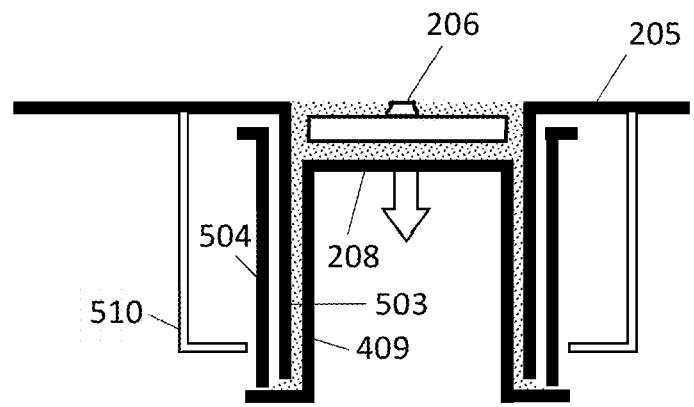
FIGS. 5A and 5B show, in a schematic section view, an embodiment of the invention.
Figure 5B:
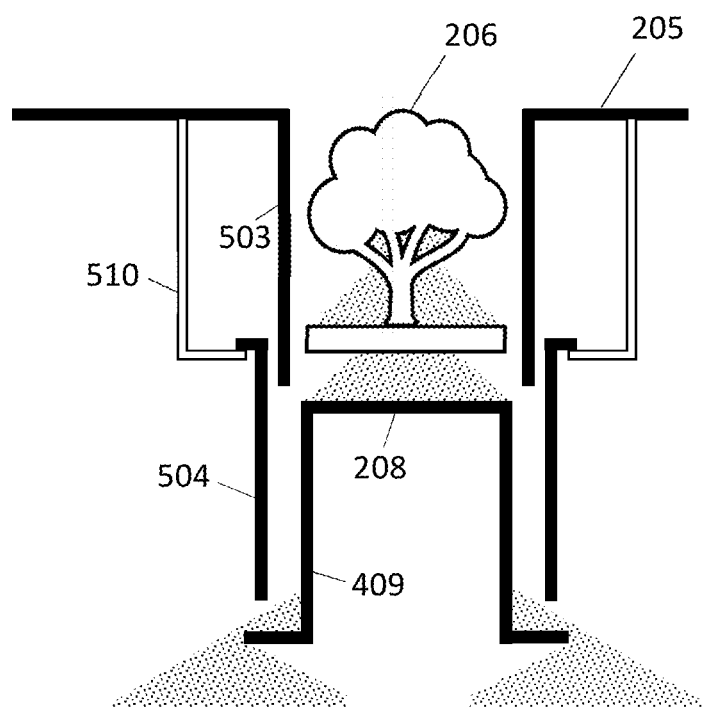

In yet another embodiment, shown in FIGS. 5A and 5B, the outermost wall structure 504, of the movable part, is lifted by a lifting mechanism 510 when the movable part reaches its lowermost position. By this mechanism the second wall structure 504 is separable, from the third wall structure 409 and the floor 208 for emptying loose powder from the build compartment. In this way, loose powder can be emptied out from the build compartment by gravitational force, immediately after the manufacturing is finished. This makes it easier to clean out excess powder when the additive manufacturing machine is prepared for the next build. A further advantage of immediate powder removal is that cooling rate of the three-dimensional object 206 is improved, since any remaining powder surrounding the three-dimensional object 206 will act as a heat insulator.

Figure 6A:
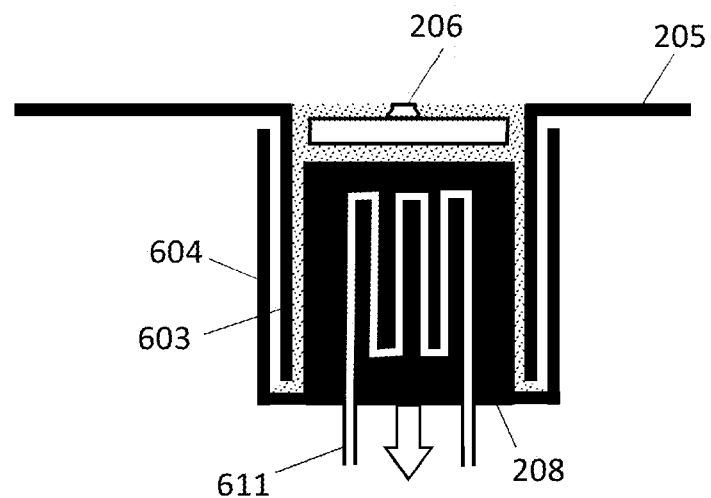
FIGS. 6A and 6B show, in a schematic section view, an embodiment of the invention.
Figure 6B:
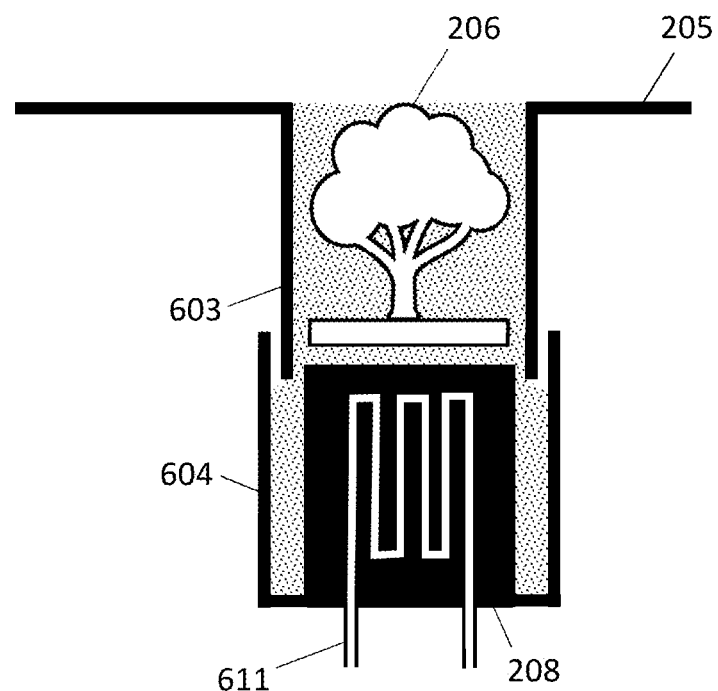

In yet another embodiment, shown in FIGS. 6A and 6B, the floor 208 is designed as a thick block of a material with good thermal conductivity, for example copper or another metal. Inside the floor 208, there is a device 611 for cooling or heating. For cooling, said device 611 can be an internal channel filled with a flowing cooling media such as cold water, oil or air. For heating, said device 611 can be an internal channel filled with a flowing heating media such as hot oil. Alternatively, for heating, said device 611 can be an internal electric heating device. The advantage of the embodiment in FIGS. 6A and 6B is that said massive floor 208 acts as a heat buffer for the build compartment, helping to maintain a steady temperature throughout the manufacturing process. Furthermore, said heating/cooling device 611 can be used to regulate the build temperature in order to stabilize the manufacturing process and to optimize the quality of the three-dimensional object. Furthermore, said device 611 can be used to improve the cooling rate immediately after the manufacturing is finished.

For some embodiments, the movable part of the build compartment may at its lowermost position, FIGS. 2B, 4B and 6B, come to a position with negative overlap in the vertical direction between the vertical wall structures. Even a small negative overlap can still prevent powder from flowing out, due to the angle of repose of the powder. However, it is desired to keep a positive overlap between the vertical wall structures to have a margin to the position when powder will flow out from the compartment.

These different embodiments should only be considered as examples not limiting the possible different geometries of the build compartment. The embodiments can also be employed in various combinations with one another.

What is claimed is:

1. An apparatus for manufacturing a three-dimensional object from powder, comprising:
a build compartment having a floor and at least two wall structures movable in relation to each other, said wall structures are at least partly overlapping in the movable direction, providing a variable volume for enclosing powder,
wherein the floor is connected to at least one of said at least two wall structures in such a way that a plane normal to the movable direction intersects the floor and another of said at least two vertical wall structures.

2. The apparatus according to claim 1, where said at least two wall structures are vertical wall structures.

3. The apparatus according to claim 1, where said at least two wall structures are inner and outer wall structures.

4. The apparatus according to claim 1, where one of said at least two wall structures is an inner wall structure having a fixed position and another of said at least two wall structures is an outer wall structure being movable, wherein the floor is attached to said outer wall structure.

5. The apparatus according to claim 1, where said two wall structures have the geometry of an inner cylinder and an outer cylinder.

6. The apparatus according to claim 1, where said two wall structures have the geometry of an inner circular cylinder and an outer circular cylinder.

7. The apparatus according to claim 1, comprising a third wall structure for reducing internal unused volume for the three-dimensional object of said build compartment.

8. The apparatus according to claim 1, comprising a mechanism for emptying loose powder from said build compartment.

9. The apparatus according to claim 1, comprising a device for cooling of said build compartment.

10. The apparatus according to claim 1, comprising a device for heating of said build compartment.

11. The apparatus according to claim 1, where said three-dimensional object is manufactured layer by layer from said powder.

12. The apparatus according to claim 1, where said three-dimensional object is manufactured by additive manufacturing.

* * * * *